United States Patent [19]

Hani et al.

[11] 3,897,533

[45] July 29, 1975

[54] METHOD OF PRODUCING MOLDABLE REINFORCED THERMOPLASTIC MATERIAL AND ARTICLES THEREFROM

[76] Inventors: Hiroshi Hani, Fujisawa; Kazuo Hiraga, Yokohama; Masuo Tsudome, Yokohama; Hiroshi Kageyama, Yokohama; Shunichi Ito, Yokohama; Shinji Iwai, Yokohama, all of Japan

[22] Filed: May 7, 1973

[21] Appl. No.: 357,530

Related U.S. Application Data

[63] Continuation of Ser. No. 13,840, Feb. 24, 1970, abandoned, which is continuation-in-part of Ser. No. 647,975, June 22, 1967, abandoned.

[30] Foreign Application Priority Data

June 24, 1966 Japan.............................. 41-040692
Oct. 12, 1966 Japan.............................. 41-066669

[52] U.S. Cl. ......... 264/137; 260/29.6; 264/DIG. 53
[51] Int. Cl. .............................................. B29d 3/02
[58] Field of Search.................... 264/137, DIG. 53; 260/29.6 WQ, 29.6 MH, 29.6 PM, 29.6 R, 29.6 N

[56] References Cited
UNITED STATES PATENTS

| | | | |
|---|---|---|---|
| 2,238,956 | 4/1941 | Strother...................... | 260/29.6 PM |
| 2,467,352 | 4/1949 | Williams..................... | 260/29.6 WQ |
| 2,577,205 | 12/1951 | Meyer.......................... | 264/DIG. 53 |
| 2,688,774 | 9/1954 | Malinowski.......................... | 264/137 |
| 2,787,572 | 4/1957 | Schwartz.......................... | 264/137 X |

*Primary Examiner*—Richard R. Kucia
*Attorney, Agent, or Firm*—Larson, Taylor and Hinds

[57] ABSTRACT

Glass fiber mat is impregnated with an aqueous emulsion of vinyl chloride polymer containing a small amount of water-immiscible organic solvent. The impregnated glass fiber mat is dried to remove water and organic solvent. Moldable reinforced thermoplastic material is obtained in which vinyl chloride polymer particles coalesce firmly with one another and adhere firmly to glass fiber. The material thus obtained can be molded into desired finished product under heat and pressure.

6 Claims, 2 Drawing Figures

PATENTED JUL 29 1975    3,897,533

INVENTORS:
HIROSHI HANI
KAZUO HIRAGI
MASUO TSUDOME
HIROSHI KAGEYAMA
SHONICHI ITO
SHINJI IWAI

BY
Bailey, Stephens & Huettig
ATTORNEYS

METHOD OF PRODUCING MOLDABLE REINFORCED THERMOPLASTIC MATERIAL AND ARTICLES THEREFROM

This is a continuation of application Ser. No. 13,840 filed Feb. 24, 1970 and now abandoned, which is a continuation-in-part of Ser. No. 647,975, June 22, 1967, now abandoned.

BACKGROUND OF THE INVENTION

1. Field Of The Invention

The present invention relates to a method of producing moldable glass fiber-reinforced vinyl chloride polymer material and molded products therefrom starting from aqueous emulsions of polyvinyl chloride or copolymers of vinyl chloride.

2. Description Of The Prior Art

In regard to the manufacture of fiber-reinforced thermoplastic resin articles, a number of suggestions have hitherto been disclosed. However, no satisfactory means has even been found for the manufacture of glass fiber-reinforced vinyl chloride resin articles reinforced by relatively long glass fibers longer than one-half inch lengths. In ordinary molding means, the presence of long fibers makes the mixing of resin with fiber remarkably hard. Adoption of aqueous emulsions of vinyl chloride resin makes the mixing of resin with fiber easy but vinyl chloride resin particles of aqueous emulsions do not generally adhere firmly with one another nor to fibers. For instance, when a glass fiber mat is immersed in an aqueous emulsion of polyvinyl chloride or vinyl chloride copolymer containing relatively small amount of comonomer, a desired quantity of emulsion can adhere to glass fiber mat. However, if this glass fiber mat is dried, the greater part of polyvinyl chloride or vinyl chloride copolymer particles may separate extremely easily as powders from glass fiber mat. Accordingly, aqueous emulsions cannot substantially be used for the manufacture of glass fiber-reinforced vinyl chloride resin articles.

BRIEF SUMMARY OF THE INVENTION

A principal object of the present invention is to provide a moldable material for the manufacture of long glass fiber-reinforced vinyl chloride resin articles.

Another object of the present invention is to provide means for the manufacture of moldable long fiber-reinforced vinyl chloride resin material from an aqueous emulsion of vinyl chloride resin.

A further object of the present invention is to provide means for the manufacture of moldable reinforced vinyl chloride resin material wherein vinyl chloride resin particles coalesce firmly with one another and adhere firmly to glass fiber.

Other objects and advantageous features of the present invention will be apparent from the following description of the invention.

These above-mentioned objects of the present invention are accomplished by the following steps:

1. Impregnating reinforcing glass fiber mat with an aqueous emulsion of vinyl chloride resin containing water-immiscible organic solvent. The organic solvent should be capable of partially swelling or dissolving the resin particles and should be present in an amount ranging from about 5 to 30% by weight of the resin.

2. Drying the thus-treated mat to remove water and organic solvent thereby causing the resin particles to coalesce firmly with one another and adhere firmly to the glass fibers. The material obtained by drying can be molded into desired shapes under heat and pressure.

DETAILED DESCRIPTION INCLUDING PREFERRED EMBODIMENTS

Figure 1:
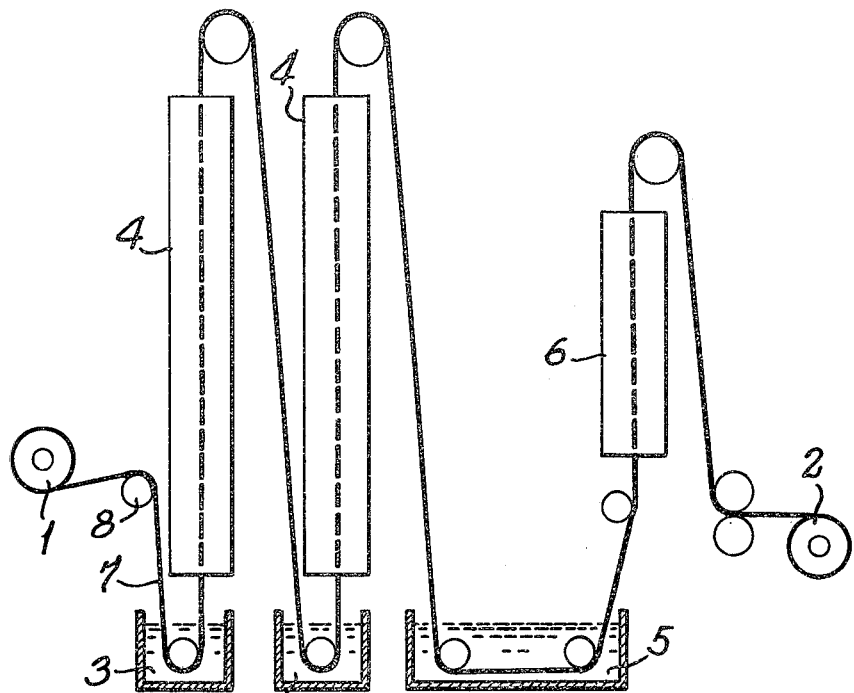
FIG. 1 is a schematic side elevational view of the apparatus for producing moldable reinforced thermoplastic material.

The thermoplastic resin employed in the present invention is a polymer or copolymer of vinyl chloride and includes homopolymers, copolymers and mixtures thereof. Illustrative of comonomers for vinyl chloride that may be used include, for instance, vinylidene chloride, vinyl acetate, alkyl acrylates, alkyl methacrylates, alkyl maleates and the like. Advantageously, the comonomers should be present in relatively small amounts, e.g. less than about 20% by weight based on the vinyl chloride. These polymers or copolymers have to be employed in the form of aqueous emulsions of resin particles which may range from 0.01 to 5 microns in size. The concentration of the resin in the emulsion is advantageously selected so that the concentration of the resin, after the addition of the solvent, amounts to over about 30% by weight. A lower concentration than this value makes the drying process impractical. The emulsion may be manufactured by conventional methods and various latices containing emulsifying agents may be employed advantageously which are produced by emulsion polymerization and available commercially or which are produced by emulsification of polyvinyl chloride powder.

Organic solvents used in the present invention are selected according to the particular vinyl chloride resin employed and should be water-immiscible and able to partially swell or dissolve the resin particles. Such solvents involve hydrocarbons such as benzene toluene, xylene, ethyl benzene, diethyl benzene, styrene, divinyl benzene and heptane; halogenated hydrocarbons such as tetrachloromethane, dichloroethane, hexachloroethane, perchloroethylene and chlorobenzene. Organic solvents consisting of polymerizable monomers such as styrene or divinyl benzene enable the manufacture of products of improved properties by polymerization of itself. The amount of these water-immiscible solvents to be mixed varies depending on the kind of resin and solvent. The excessive quantity of water-immiscible solvent rather destroys the emulsion and brings about various disadvantages and difficulties at the time of drying and water-immiscible solvents have a tendency to destroy the emulsion. Too small an amount of solvent makes accomplishment of the objects impossible. The quantity of solvent in the present invention is selected from the range of about 5 to 30% by weight. The solvent may be added to the emulsion alone or in admixture with other solvents or water. In order to distribute the solvent homogeneously into the emulsion, an emulsifying agent may preferably be added. Coloring material, stabilizer, polymerization catalyst for polymerizable monomer, filler, plasticizer and other additives may be added, if desired.

As is apparent from the working examples to follow, the aqueous emulsion of vinyl chloride polymer resin containing organic solvent is an oil-in-water type emulsion similar in external appearance to an aqueous emulsion free from organic solvent, but the adhesive property of resin particles is remarkably improved. As a result, when the reinforcing glass fiber mat is impregnated with the aqueous emulsion and dried, the resin particles coalesce or adhere firmly with one another and adhere firmly to glass fiber to form a continuous sheet. Thus, resin particles of polyvinyl chloride or copolymer of vinyl chloride having poor adhesive property can provide reinforced sheet material capable of being used as a molding material. In contrast to oil-in-water emulsions of vinyl chloride polymer, water-in-oil emulsions of vinyl chloride polymer containing over about 30% by weight of the resin cannot be used in the present invention. This type of emulsion is viscous and cannot be impregnated sufficiently easily and homogeneously into the interior of glass fiber mat. Further, it necessitates the recovering of costly solvent and brings about the increased danger.

Fibers used in the present invention are glass fiber which can be used for the reinforcement of plastics. Fibers have to be in the form of mat capable of forming sheets, in particular continuous sheets. The mat is made of glass fiber longer than one-half inch and may be chopped strand mat.

The impregnation of glass fiber mat with aqueous emulsion of the present invention may be achieved by immersing the fiber mat in aqueous emulsion, furnishing aqueous emulsion onto fiber mat, furnishing fiber mat onto aqueous emulsion, spraying fiber and aqueous emulsion simultaneously or other means. In order to control the proportion of resin to fiber mat, the squeezing by rollers or doctor-knife may be adopted and the impregnation may also be repeated.

The drying of fiber mat impregnated with aqueous emulsion is effected at temperatures of from room temperature to 180°C., preferably from 70° to 140°C., whereby water and a part of substantially the whole of solvent are removed. A part of polymerizable monomer is polymerized in the course of drying. The drying is achieved by contact with hot gas, irradiation or infrared ray or other means. When the removal of an undesirable component contained in emulsion, for instance, an emulsifying agent is desired, the dried material is further washed with warm water or a suitable solvent.

The steps described above in the present invention will be illustrated in detail with reference to FIG. 1 of the accompanying drawings.

Chopped strand mat of glass fiber 7 is unwound from a reel 1 and passed through an impregnation tank 3 containing thermoplastic resin emulsion through guide rollers 8. The mat impregnated with the emulsion is moved upwardly inside a drying tower 4 and is dried by counter-current contact with hot air. Thereafter, the impregnation and drying of the emulsion are repeated in the same manner. The resulting sheet material is washed in a washing tank 5, dried in a drying tower 6 and then wound up on a reel 2.

The sheet material thus manufactured contains 5 to 60% by weight, preferably from 10 to 40% by weight, of fiber and is rich in void (voidness about 20 to 50%). Fibers are dispersed uniformly in the sheet material. Further, resin particles coalesce firmly with one another and adhere firmly to glass fiber mat. Thus, the sheet material can be molded into any desired shape under heat and pressure. The sheet material may be used for molding, conveyed or stored.

The molding may be accomplished in various manners. The appropriate temperature and pressure varies depending upon the kind of resin and polyvinyl chloride or copolymer of vinyl chloride is usually molded at 110° to 200°C. and under a pressure of 5 to 100 kg/cm². Polymerization of polymerizable monomers is completed under molding temperature and pressure. When sheet products are desired, moldable sheet material is heated under pressure between polished sheet plates or pressed between hot rollers (roller-molding). Surfacing sheet or pictured sheet may also be laminated.

Figure 2:
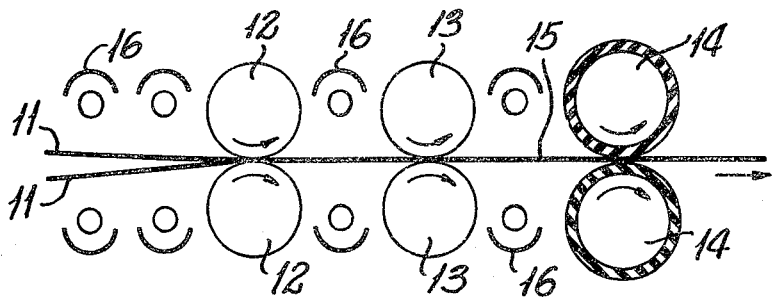
FIG. 2 is a schematic side elevational view of the apparatus for roller-molding of the moldable reinforced thermoplastic material.

In FIG. 2, two sheets of moldable sheet material 11 are supplied, heated with infrared lamp 16 and heated under pressure by hot rollers 12 and 13. The sheet product 15 thus obtained is cooled between two cold rollers coated with rubber 14 to a temperature below its softening point and is drawn out. A larger number of rollers may be used. Corrugated sheet products can be manufactured by corrugating the sheet product or by directly heating the moldable sheet material under pressure. Furthermore, moldable sheet material may be transfermolded, compression-molded with matched metal dies, deep-draw molded or injection-molded after cutting down. The moldable material of the present invention may reach freely and gradually into every corner of mold cavity under heat and pressure without uneven distribution of the fiber. Thus, in the compression-molding, it is possible to feed a predetermined amount of sheet material into a certain place in a mold cavity and cause it to spread throughout the cavity and, in the deep-draw molding, no stretching and thinning-out of resins at corners occurs during molding.

The invention is further described in the following examples which are illustrative but not limitative thereof.

EXAMPLE I

4Kg of ethylene dichloride and 0.6 Kg of organic tin compound stabilizer were added gradually to 40 Kg polyvinyl chloride latex (solid content — 50% by weight; the degree of polymerization — about 1300) with stirring and mixed therewith. Chopped strand mat of glass fiber (380 gms/m²) was immersed in the latex, drawn out, squeezed with 2 rubber rollers and dried for 5 minutes at 115°C. to give a moldable sheet material of about 1.7 mm thickness.

Thus obtained 7 layers of about 320 gms moldable material were placed in the bottom of a female mold for the manufacture of helmet and a male mold was put thereon. The moldable material was uniformly spread over all parts of the mold in 10 minutes under pressure of 50 Kg/cm² at 160°C. The glass fiber content of the helmet obtained was 35%.

EXAMPLE II 7.5 Parts by weight of ethylene dichloride and 2.5 parts by weight of diocthyl phthalate were added to 100 parts by weight of polyvinyl chloride latex as described in Example I wth stirring. Shopped strand mat of glass fiber was immersed in said latex, drawn out, squeezed with 2 rubber rollers and then dried for 5 minutes at 70°C. Thus obtained moldable sheet material was heated under pressure of 60 Kg/cm² between polished metal plates at 140°C. A 1 mm thick reinforced thermoplastic sheet containing 30% by weight of glass fiber was obtained. The flexural strength measured according to ASTM D 790-62 was 19.3 Kg/mm² and the impact strength measured according to ASTM D 256-56 (Method B) 65.6 Kg·cm/cm². The flexural and impact strengths of polyvinyl chloride plate containing no fiber available commercially were measured in the same manner as 11.2 Kg/mm² and 2.6 Kg·cm/cm².

EXAMPLE III

10 Parts by weight of ethyl benzene were gradually added with stirring to 100 parts by weight of vinyl chloride-vinyl acetate copolymer latex (solid content — 53% by weight; ratio of vinyl chloride to vinyl acetate — 90 : 10 by weight). Said emulsion was spread on glass plate, chopped strand mat of glass fiber was placed on the emulsion. Glass fiber mat impregnated with the emulsion was dried for 10 minutes at 75°C.

Thus obtained moldable sheet material was heated for 10 minutes under pressure of 50 Kg/cm² at 130°C. between polished metal plates. An about 1 mm thick reinforced sheet containing 25% by weight of glass fiber was obtained.

EXAMPLE IV

An emulsion consisting of 400 gms of xylene, 25 gms of potassium oleate and 265 gms of water was added with stirring to 4 Kg of polyvinyl chloride latex as described in Example I. Chopped strand mat of glass fiber (380 gms/m²) was passed through the emulsion mixture at a velocity of 15 m/hr continuously. The amount of emulsion to be impregnated in the fiber mat was controlled by doctor-knife. The fiber mat was passed through a drying tower held at 130°C. for 12 minutes. An about 1.7 mm thick moldable continuous sheet material was obtained and wound up on a 40 cm diameter reel.

The moldable sheet material thus obtained was cut and heated at 175°C. for 3 minutes under pressure of 50 Kg/cm² between polished metal plates. A 1.1 mm thick reinforced thermoplastic sheet containing 40% by weight of glass fiber was obtained.

Furthermore, reinforced thermoplastic sheet was continuously manufactured from two sheets of moldable continuous sheet material in the apparatus shown in FIG. 2. The moldable sheet material was preheated at about 140°C. by infrared lamp and heated under pressure by rollers. The temperature of the surfaces of rollers 12 and 13 was held at about 180°C. A space between rollers 12 was 2.00 mm and that between rollers 13 was held 1.85 mm. An about 2.2 mm thick reinforced sheet material was obtained at the rate of about 10 m/hr.

Meanwhile, a chopped strand mat of glass fiber was impregnated with the emulsion not containing xylene and dried under the same conditions as described above. In the sheet material thus obtained, polyvinyl chloride particles do not coalesce firmly with one another and they adhere poorly to glass fiber. In handling or working the sheet material, polyvinyl chloride particles separate easily from the material as powders and the material cannot be used for molding.

EXAMPLE V

1 Kg of toluene and 0.15 Kg of organic tin compound stabilizer was added with stirring to 10 Kg of vinyl chloride-methyl acrylate copolymer latex (solid content — 53% by weight; the ratio of vinyl chloride to methyl acrylate — 94 : 6 by weight). A moldable sheet material was obtained from said latex in the same manner as in Example I.

About 800 gms 7 layer moldable sheet material thus obtained was placed in the bottom part of a female mold for the manufacture of curved chair part and the male mold was put thereon. The moldable material was spread uniformly in every part of the mold in 5 minutes under 30 Kg/cm² and at 145°C. The glass fiber content of thus obtained product was 40%.

Furthermore, about 300 gms 3 layer moldable sheet material were placed on a female mold for the manufacture of bucket, covering over the top edge of the mold. The heated male mold was lowered to soften and deform the sheet material and gradually pushing it into the female mold. In about 10 minutes a bucket having a uniform thickness and glass fiber distribution was obtained by such deep-draw molding.

EXAMPLE VI 100 gms of styrene containing 1.5 gms of benzoyl peroxide were added under stirring to 100 gms of vinyl chloride-methyl acrylate copolymer latex as described in Example V. Chopped strand mat of glass fiber (500 gms/m²) was immersed in the latex, drawn out and squeezed with two rubber rollers and dried for 3 minutes at 125°C.

Moldable sheet material thus obtained was heated for 7 minutes at 150°C. under pressure of 27 Kg/cm² between corrugated metal plates. A 1 mm thick corrugated reinforced sheet containing 15% by weight of glass fiber was obtained. The deflection temperature measured according to ASTM D-648-56 was 93.8°C.

The deflection temperature for corrugated reinforced sheet manufactured as above-mentioned using the same amount of divinyl benzene instead of styrene was 118.0°C. Further, the deflection temperature for corrugated reinforced sheet manufactured as above-mentioned using the same amount of ethyl benzene instead of styrene was 61.8°C.

It is claimed:

1. A method of producing moldable reinforced thermoplastic sheet material from vinyl chloride polymer having poor adhesive property to reinforcing glass fiber and to itself, which comprises impregnating a reinforcing glass fiber mat having glass fiber longer than one-half inch with an oil-in-water emulsion of vinyl chloride polymer resin particles containing an organic solvent capable of partially swelling the resin particles until the impregnated polymer content reaches to 60 to 90% by weight of the sheet material to be produced, said emulsion containing over about 30% by weight based upon the emulsion, of the polymer resin and from 5 to 30% by weight based upon the polymer, of the organic solvent, and said organic solvent being selected from hydrocarbons and halogenated hydrocarbons and drying the mat thus treated to remove water and organic solvent, thereby causing the polymer particles to coalesce firmly with one another and adhere to the glass fiber mat.

2. The method as claimed in claim 1 in which vinyl chloride polymer is selected from the group consisting of polyvinyl chloride and copolymer of vinyl chloride.

3. A method of producing moldable reinforced thermoplastic sheet material from vinyl chloride polymer having poor adhesive property to reinforcing glass fiber and to itself, which comprises impregnating a reinforcing glass fiber mat having glass fiber longer than one-half inch with an oil-in-water emulsion of vinyl chloride polymer resin particles containing an organic solvent capable of partially swelling the resin particles until the impregnated polymer content reaches to 60 to 90% by weight of the sheet material to be produced, said emulsion containing over about 30% by weight based upon the emulsion, of the polymer resin and from 5 to 30% by weight based upon the polymer, of the organic solvent, and said organic solvent being selected from hydrocarbons and halogenated hydrocarbons and drying the mat thus treated to remove water and organic solvent, thereby causing the polymer particles to coalesce firmly with one another and adhere to the glass fiber mat, and molding the thus contained material at 110° to 200°C. and under a pressure of 5 to 100 kg/cm$^2$.

4. The method as claimed in claim 3 in which vinyl chloride polymer is selected from the group consisting of polyvinyl chloride and copolymer of vinyl chloride.

5. The method as claimed in claim 3 in which the molding is carried out by roller-molding.

6. The method as claimed in claim 3 in which the molding is carried out by compression-molding.

* * * * *